(12) United States Patent
Wood

(10) Patent No.: US 7,788,993 B2
(45) Date of Patent: Sep. 7, 2010

(54) TIE ROD ASSEMBLY

(75) Inventor: Jeffrey H. Wood, Eureka, MO (US)

(73) Assignee: The Boeing Company, Chicago, IL (US)

( * ) Notice: Subject to any disclaimer, the term of this patent is extended or adjusted under 35 U.S.C. 154(b) by 185 days.

(21) Appl. No.: 12/040,876

(22) Filed: Mar. 1, 2008

(65) Prior Publication Data
US 2009/0218777 A1 Sep. 3, 2009

(51) Int. Cl.
*F16C 7/06* (2006.01)
(52) U.S. Cl. .................. 74/579 R; 280/93.51; 403/67; 403/79; 403/151
(58) Field of Classification Search .......... 403/67, 403/79, 150, 151, 157, 305, 306, 315, 316, 403/317, 320, 344; 74/579 R, 594; 280/124.1, 280/93.502, 93.51
See application file for complete search history.

(56) References Cited

U.S. PATENT DOCUMENTS

| | | | | | |
|---|---|---|---|---|---|
| 339,733 | A | * | 4/1886 | Blain | 74/579 R |
| 2,016,856 | A | * | 10/1935 | Fiege | 403/305 |
| 3,514,140 | A | * | 5/1970 | Ely et al. | 403/305 |
| 5,009,538 | A | * | 4/1991 | Shirai et al. | 403/134 |
| 6,089,779 | A | * | 7/2000 | Lancelot, III | 403/313 |
| 6,161,451 | A | * | 12/2000 | Gleason, II | 74/579 R |
| 6,902,341 | B1 | * | 6/2005 | Rauschert | 403/79 |

* cited by examiner

*Primary Examiner*—Michael P Ferguson
(74) *Attorney, Agent, or Firm*—Tung & Associates

(57) ABSTRACT

A tie rod assembly includes a composite tie rod shaft having a first end and a second end, a first clevis carried by the first end of the tie rod shaft, a clevis adjustment collar carried by the second end of the tie rod shaft and a second clevis carried by and adjustable along the clevis adjustment collar. A method of connecting a fitting to a shaft is also disclosed.

11 Claims, 5 Drawing Sheets

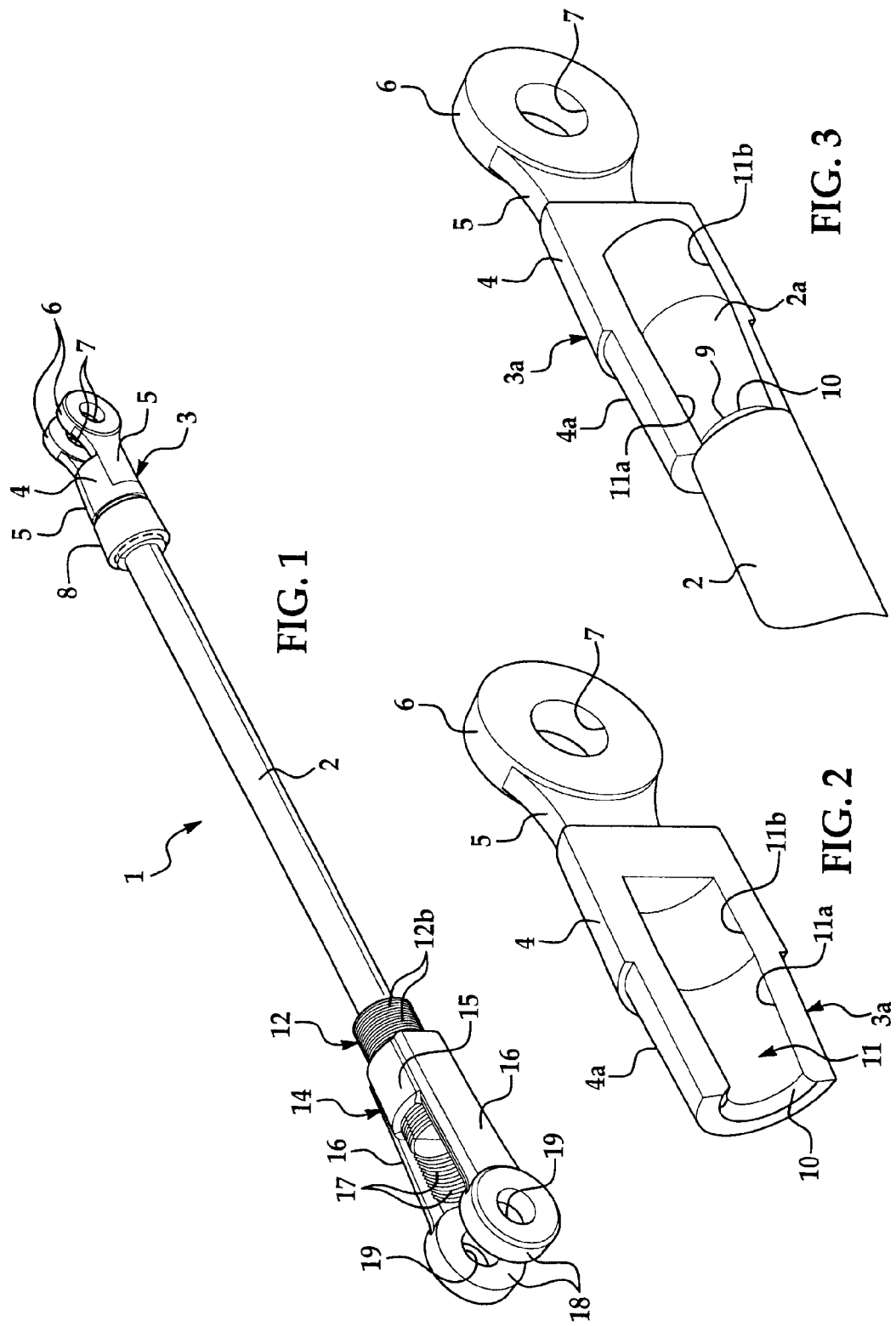

US 7,788,993 B2

TIE ROD ASSEMBLY

TECHNICAL FIELD

The disclosure relates to tie rod assemblies. More particularly, the disclosure relates to a high-strength, lightweight tie rod assembly.

BACKGROUND

Tie rods are devices that tie or couple one structural member to another, typically for the purpose of transmitting power or loads through the coupled members. Tie rods may include a straight rod that contains fittings on each end for attachment to external structural members. These fittings may be a common spherical bearing rod end. Tie rods may have a mechanism for adjusting the overall length of the tie rod. This may be accomplished using threaded members integrated within the tie rod assembly or overlapping rod sections where an outer tubular rod clamps tightly over the internal solid rod member. When used, the threaded member may co-function with one of the clevis fittings on one end of the assembly.

Since loads may be transmitted through tie rods, the tie rods may be fabricated from steel for maximum strength. However, there may be many applications for tie rods in weight-critical structures such as aircraft or high-performance racing vehicles that would benefit from low-weight tie rods to maximize performance. There are yet other applications, such as in the boating and marine industries, for example, that may require the use of a tie rod in a wet corrosive environment. There is a commercial need for premium tie rods that utilize high performance materials combining corrosion-resistance and high-strength material properties.

SUMMARY

The disclosure is generally directed to a tie rod assembly. An illustrative embodiment of the tie rod assembly includes a composite tie rod shaft having a first end and a second end, a first clevis carried by the first end of the tie rod shaft, a clevis adjustment collar carried by the second end of the tie rod shaft and a second clevis carried by and adjustable along the clevis adjustment collar.

The disclosure is further generally directed to a method of connecting a fitting to a shaft. An illustrative embodiment of the method includes providing a shaft having a wedge-shaped shaft attachment head, providing a fitting having a shaft receptacle, and inserting the shaft attachment head of the shaft into the shaft receptacle of the fitting.

BRIEF DESCRIPTION OF THE ILLUSTRATIONS

FIG. 1 is a perspective view of an illustrative embodiment of the tie rod assembly.

FIG. 2 is a perspective view of a clevis section of a fixed clevis of an illustrative embodiment of the tie rod assembly.

FIG. 3 is a perspective view of the clevis section of the fixed clevis, with a shaft attachment head of a tie rod shaft fitted in a shaft receptacle in the clevis section.

DETAILED DESCRIPTION

Figure 4:
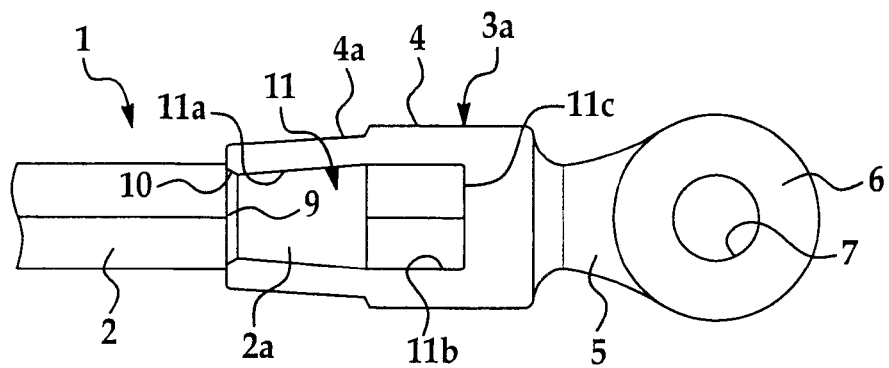
FIG. 4 is a side view of the clevis section of the fixed clevis, with the shaft attachment head of the tie rod shaft fitted in the shaft receptacle in the clevis section.

Referring initially to FIGS. 1-5 and 8-10 of the drawings, an illustrative embodiment of the tie rod assembly is generally indicated by reference numeral 1. The tie rod assembly 1 may include a generally elongated tie rod shaft 2 which may be a composite material, for example and without limitation. A fixed clevis 3 may be provided on a first end of the tie rod shaft 2. An adjustable clevis 14 may be provided on a second end of the tie rod shaft 2. The fixed clevis 3 and the adjustable clevis 14 may each be titanium, for example and without limitation.

As shown in FIG. 1, in some embodiments the fixed clevis 3 may include a fixed clevis base 4 which may be generally cylindrical. A pair of generally parallel, spaced-apart clevis arms 5 may extend from the fixed clevis base 4. The clevis arms 5 may be disposed in generally parallel relationship with respect to the longitudinal axis of the tie rod shaft 2. A clevis eye 6, having a central clevis eye opening 7, may extend from each clevis arm 5. The clevis eyes 6 may be disposed in generally parallel, spaced-apart relationship to each other with the clevis eye openings 7 aligned with each other.

Figure 5:
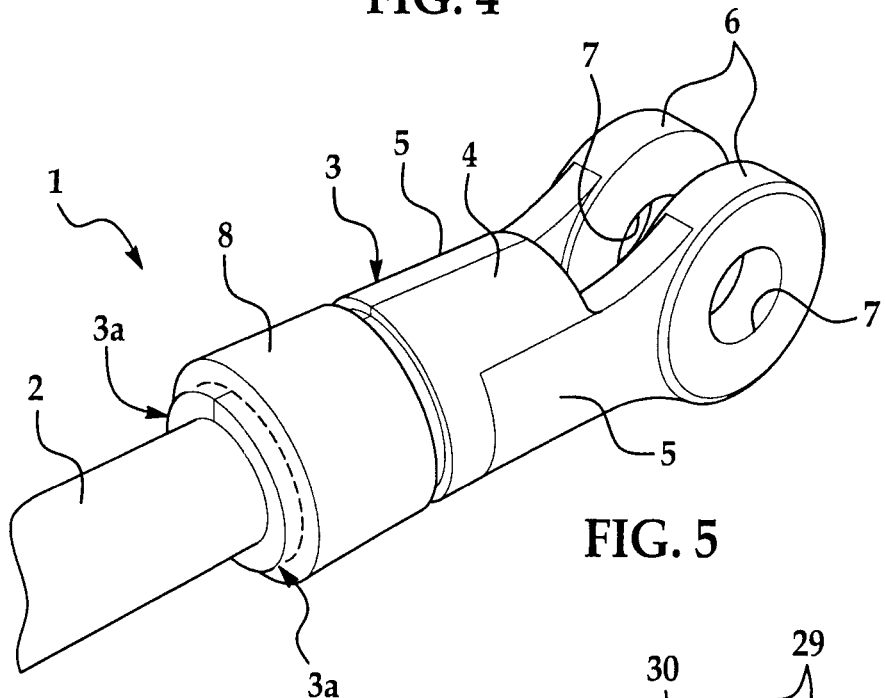
FIG. 5 is a perspective view of the fixed clevis of an illustrative embodiment of the tie rod assembly, provided on a tie rod shaft (partially in section).

As shown in FIGS. 2-4, in some embodiments the fixed clevis 3 (FIG. 1) of the tie rod assembly 1 may be fabricated as complementary mating pairs of half-clevis sections 3a which are fitted around opposite sides of the tie rod shaft 2. As shown in FIGS. 1 and 5, a lock ring 8 may engage the fixed clevis base 4 of the fixed clevis 3 and secure the half-clevis sections 3a of the fixed clevis 3 to each other and to the tie rod shaft 2. An exterior lock ring seat 4a may be provided in the clevis base 4 of each half-clevis section 3a to receive the lock ring 8.

A shaft receptacle 11 may extend into the clevis base 4 of each half-clevis section 3a. The shaft receptacle 11 may have a tapered-wall portion 11a and a flat-wall portion 11b which extends from the tapered-wall portion 11a. The tapered-wall portion 11a of the shaft receptacle 11 may progressively widen in a wedge shape from the end which receives the tie rod shaft 2 toward the flat-wall portion 11b. Accordingly, as shown in FIGS. 3 and 4, a shaft attachment head 2a may be provided on an end of the tie rod shaft 2. The shaft attachment head 2a may be sized and configured in a wedge-shaped geometric configuration to match and fit in the tapered-wall portion 11a and the flat-wall portion 11b of the shaft receptacles 11 in the respective complementary half-clevis sections 3a of the fixed clevis 3. Therefore, the wedge-shaped configuration of the shaft attachment head 2a which matches and fits into the tapered-wall portion 11a of the shaft receptacle 11 may facilitate locking of the shaft attachment head 2a into the shaft receptacle 11 of the corresponding half clevis section 3a, as shown in FIGS. 3 and 4, since the shaft attachment head 2a of the tie rod shaft 2 cannot be pulled outwardly beyond the smaller-diameter tapered-wall portion 11a of the fixed clevis 3. As shown in FIG. 4, the fixed clevis base 4 may be bonded to the shaft attachment head 2a along a bond line 11c which extends along some or all of the interface between each clevis section 3a and the shaft attachment head 2a.

As further shown in FIGS. 3 and 4, an annular tapered bevel 9 may be provided between the main portion of the tie rod shaft 2 and the shaft attachment head 2a. A reverse tapered groove 10 which is generally complementary to the tapered bevel 9 may be provided in the clevis base 4 of the fixed clevis 3 at the opening of the tapered-wall portion 11a of the shaft receptacle 11. When the shaft receptacle 11 receives the shaft attachment head 2a of the tie rod shaft 2, the tapered bevel 9 in the tie rod shaft 2 may engage the complementary reverse tapered groove 10 in the clevis base 4, as shown in FIGS. 3 and 4.

As shown in FIG. 1, the adjustable clevis 14 of the tie rod assembly 1 may include a clevis base 15 which may have a generally cylindrical configuration. A pair of generally parallel, spaced-apart clevis arms 16 may extend from the clevis base 15. The clevis arms 16 may be disposed in generally parallel relationship with respect to the longitudinal axis of the tie rod shaft 2. A clevis eye 18, having a central clevis eye opening 19, may extend from each clevis arm 16. The clevis eyes 18 may be disposed in generally parallel, spaced-apart relationship to each other with the clevis eye openings 19 aligned with each other.

In some embodiments, the adjustable clevis 14 may be attached to the tie rod shaft 2 in such a manner that the adjustable clevis 14 is positionally adjustable on the tie rod shaft 2 to selectively vary the overall length of the tie rod assembly 1. Adjustable mounting of the adjustable clevis 14 may be facilitated using any suitable technique known to those skilled in the art. As shown in FIG. 1, in some embodiments a threaded clevis attachment collar 12 having exterior clevis adjustment threads 12b may be provided on the tie rod shaft 2. Clevis arm threads 17 may be provided on the interior surface of each clevis arm 16. The clevis arm threads 17 may threadably engage the companion clevis adjustment threads 12b provided on the exterior of the clevis adjustment collar 12 to vary the position of the adjustable clevis 14 along the length of the clevis adjustment collar 12 as the adjustable clevis 14 is rotated with respect to the clevis adjustment collar 12. The clevis adjustment collar 12 may be titanium, for example and without limitation.

Figure 8:
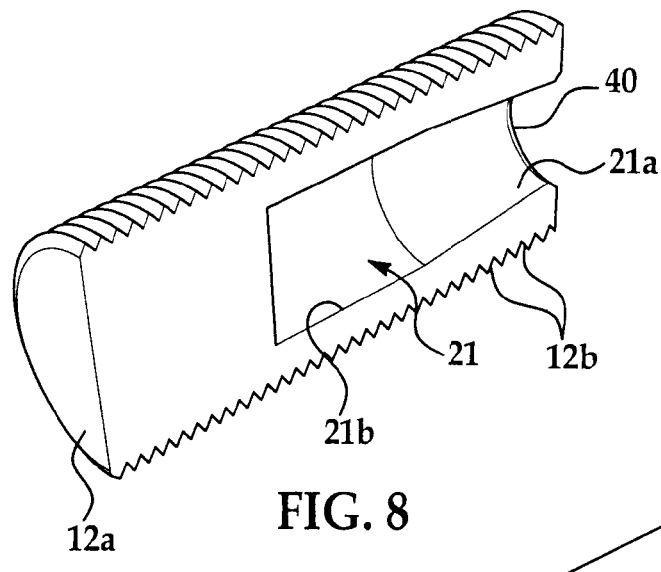
FIG. 8 is a perspective view of a collar section of a clevis adjustment collar of an adjustable clevis on an illustrative embodiment of the tie rod assembly.
Figure 9:
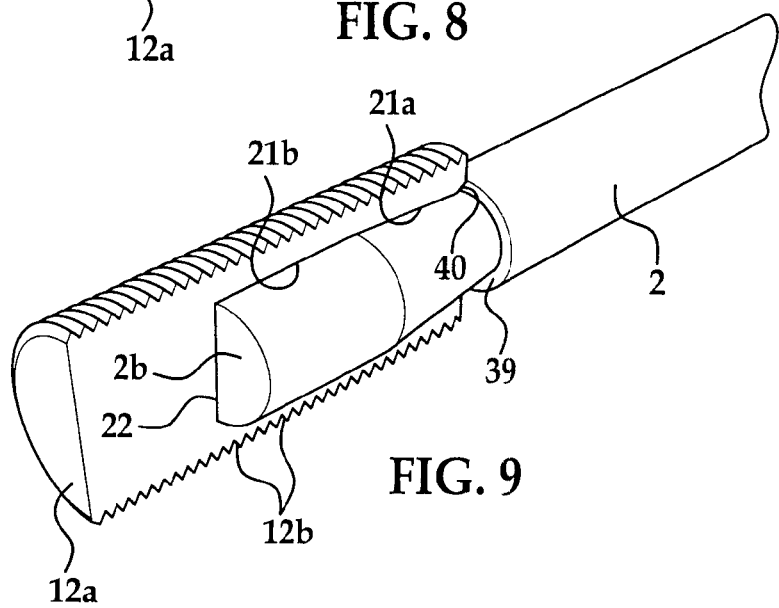
FIG. 9 is a perspective view of the collar section, with a shaft attachment head of the tie rod shaft fitted in the shaft receptacle in the collar section.
Figure 10:
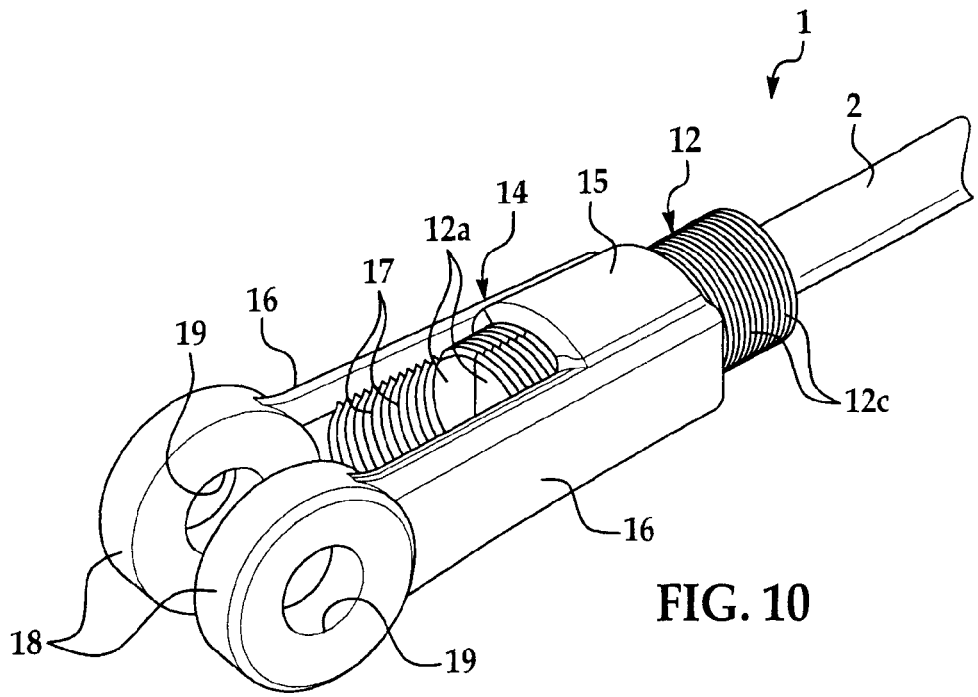
FIG. 10 is a perspective view of an adjustable clevis element of an illustrative embodiment of the tie rod assembly, provided on a tie rod shaft (partially in section).

As shown in FIGS. 8-10, in some embodiments the clevis adjustment collar 12 of the tie rod assembly 1 may be fabricated as complementary mating pairs of half-collar sections 12a which are fitted around opposite sides of the tie rod shaft 2. A shaft receptacle 21 may be provided in each half-collar section 12a. The shaft receptacle 21 may have a tapered-wall portion 21a and a flat-wall portion 21b which extends from the tapered-wall portion 21a. The tapered-wall portion 21a of the shaft receptacle 21 may progressively widen in a wedge shape from the end which receives the tie rod shaft 2 toward the flat-wall portion 21b. Accordingly, as shown in FIG. 9, a shaft attachment head 2b may be provided on an end of the tie rod shaft 2. The shaft attachment head 2b may be sized and configured in a wedge geometrical shape to match and fit in the tapered-wall portion 21a and the flat-wall portion 21b of the shaft receptacles 21 in the respective complementary half-collar sections 12a of the clevis adjustment collar 12. Therefore, the wedge-shaped configuration of the shaft attachment head 2b which matches and fits into the tapered-wall portion 21a of the shaft receptacle 21 may facilitate locking of the shaft attachment head 2b into the shaft receptacle 21 of the corresponding half collar section 12a, as shown in FIG. 9, since the shaft attachment head 2b of the tie rod shaft 2 cannot be pulled outwardly beyond the smaller-diameter tapered-wall portion 21a of the clevis attachment collar 12. When it is installed on the clevis adjustment collar 12, the adjustable clevis 14 may act as a lock ring and prevent the half-collar sections 12a from separating during tension loading of the tie rod assembly 1. As shown in FIG. 9, each half-collar section 12a of the clevis adjustment collar 12 may be bonded to the shaft attachment head 2a along a bond line 22 which extends along some or all of the interface between each half-collar section 12a and the shaft attachment head 2b.

As further shown in FIGS. 8 and 9, an annular tapered bevel 39 (FIG. 9) may be provided between the main portion of the tie rod shaft 2 and the shaft attachment head 2b. A reverse tapered groove 40 which is generally complementary to the tapered bevel 39 may be provided in the clevis adjustment collar 12 at the opening of the tapered-wall portion 21a of the shaft receptacle 21. When the shaft receptacle 21 receives the shaft attachment head 2b of the tie rod shaft 2, the tapered bevel 39 in the tie rod shaft 2 may engage the complementary reverse tapered groove 40 in the clevis adjustment collar 12, as shown in FIG. 9.

In typical use, one or multiple tie rod assemblies 1 is/are used to tie or couple a first structural member (not shown) to a second structural member (not shown), typically for the purpose of transmitting power or loads through the coupled members, in any of a variety of applications which includes but is not limited to application in the aerospace industry. The fixed clevis 3 may be coupled to the first structural member by extending an attachment flange (not shown) provided on the first structural member between the spaced-apart clevis eyes 6 of the fixed clevis 3. Next, a clevis pin (not shown) may be extended through the clevis eye openings 7 in the respective clevis eyes 6 and through a registering clevis pin opening (not shown) provided in the attachment flange on the first structural member.

The overall length of the tie rod assembly 1 may be finely adjusted as needed to achieve the proper reach of the tie rod assembly 1 between the first structural member and the second structural member by adjusting the adjustable clevis 14 along the second end of the tie rod shaft 2. This length adjustment may be accomplished by rotating the adjustable clevis 14 on the clevis adjustment collar 12. Therefore, each rotation of the adjustable clevis 14 on the clevis adjustment collar 12 facilitates lengthwise positional adjustment of the adjustable clevis 14 for a length which corresponds to the pitch of the adjustment threads 12b on the adjustment collar 12.

The adjustable clevis 14 may be coupled to the second structural member by extending an attachment flange (not shown) provided on the second structural member between the spaced-apart clevis eyes 18 of the adjustable clevis 14. Next, a clevis pin (not shown) may be extended through the clevis eye openings 19 in the respective clevis eyes 18 and through a registering clevis pin opening (not shown) provided in the attachment flange on the second structural member. It will be appreciated by those skilled in the art that in some embodiments the tie rod assembly 1 combines the high strength and lightweight properties of composite and titanium materials. Furthermore, since titanium and composites are galvanically compatible, these materials may be most suitable when it is necessary to couple composites with metallic materials.

Figure 6:
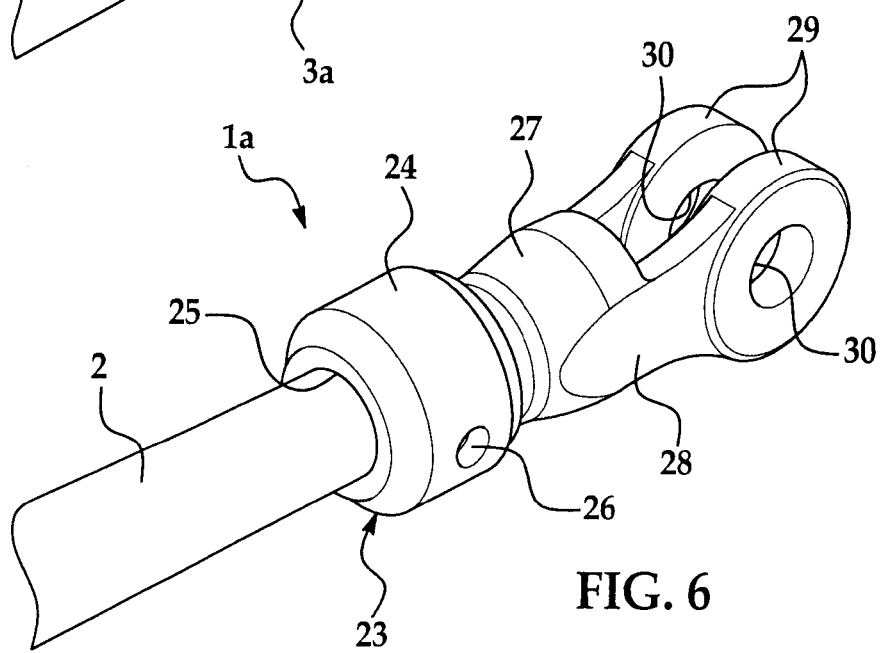
FIG. 6 is a perspective view of an alternative fixed clevis of another illustrative embodiment of the tie rod assembly, provided on a tie rod shaft (partially in section).

Referring next to FIG. 6, an alternative illustrative embodiment of the tie rod assembly 1a includes a fixed clevis 23 which may have an upsized clevis collar 24. The upsized clevis collar 24 is fabricated in one piece with a hole 25 in one end to receive the tie rod shaft 2. A cross pin 26 may be extended through registering pin openings (not numbered) provided in the upsized clevis collar 24 and in the tie rod shaft 2, respectively, to secure the upsized clevis collar 24 to the tie rod shaft 2. The upsized clevis collar 24 may additionally be bonded and/or otherwise secured to the tie rod shaft 2. A clevis base 27 may extend from the clevis collar 24, a pair of spaced-apart clevis arms 28 may extend from the clevis base 27 and a clevis eye 29 having a clevis eye opening 30 may extend from each clevis arm 28. The tie rod assembly 1a may be suitable for medium to heavy duty tension applications.

Figure 7:
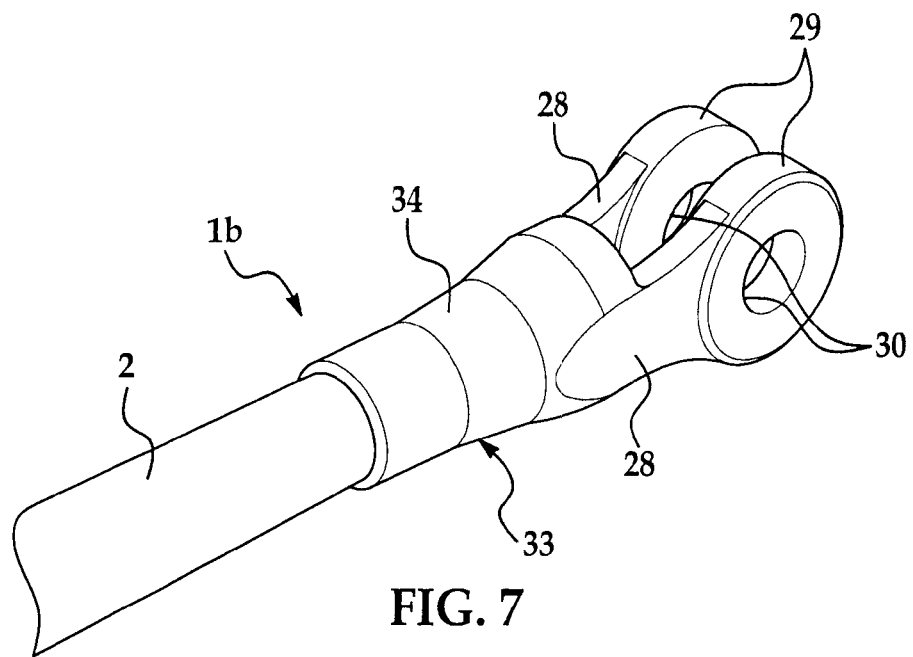
FIG. 7 is a perspective view of another alternative fixed clevis of another illustrative embodiment of the tie rod assembly, provided on a tie rod shaft (partially in section).

Referring next to FIG. 7, another alternative embodiment of the tie rod assembly 1b includes a fixed clevis 33 having a clevis base 34 which may be bonded to the tie rod shaft 2. The clevis arms 28 extend from the clevis base 34. The tie rod assembly 1b may be suitable for light-duty tension or compression applications.

Figure 11:
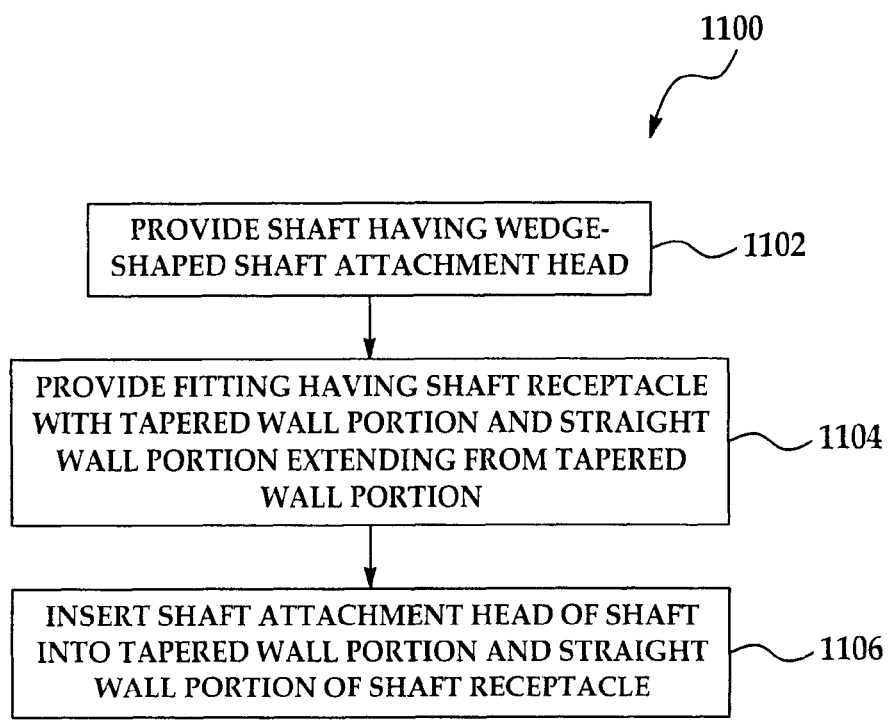
FIG. 11 is a flow diagram which illustrates an illustrative embodiment of a method to connect a fitting to a shaft using a wedge lock feature.

Referring next to FIG. 11, a flow diagram 1100 which illustrates an illustrative embodiment of a method to connect a fitting to a shaft using a wedge lock feature is shown. In block 1102, a shaft having a wedge-shaped shaft attachment head is provided. In block 1104, a fitting having a shaft receptacle with a tapered wall portion and a straight wall portion extending from the tapered wall portion is provided. In block 1106, the shaft attachment head of the shaft is inserted into the tapered wall portion and the straight wall portion of the shaft receptacle.

Figure 12:
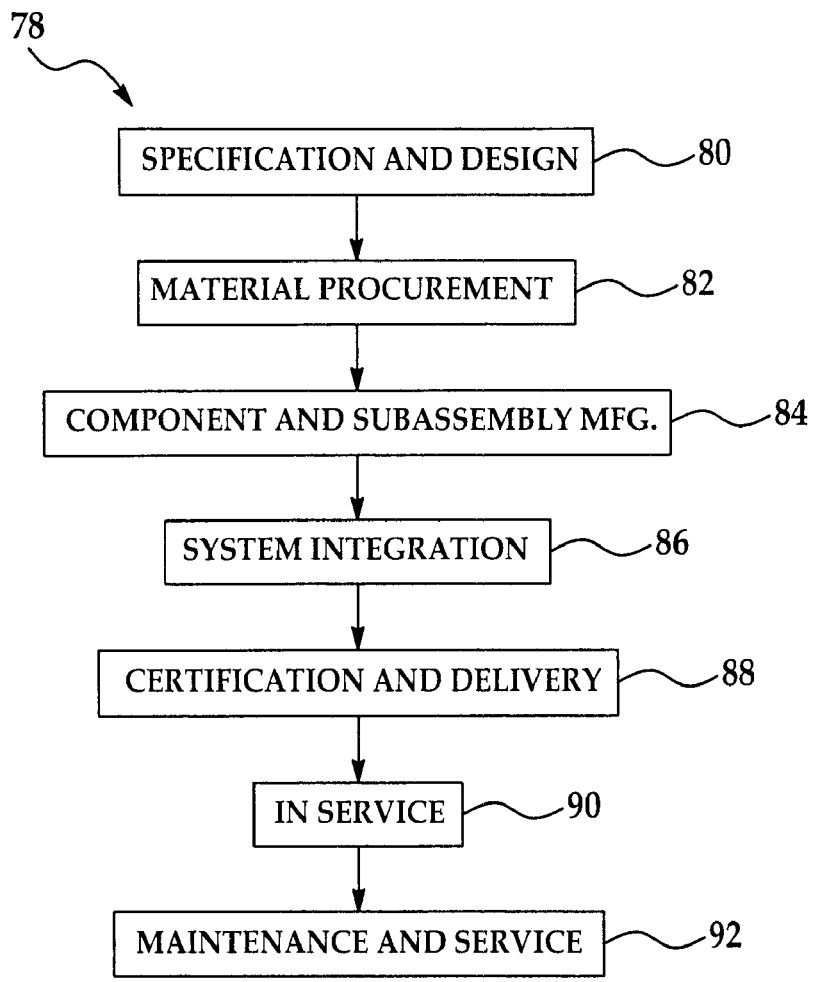
FIG. 12 is a flow diagram of an aircraft production and service methodology.
Figure 13:
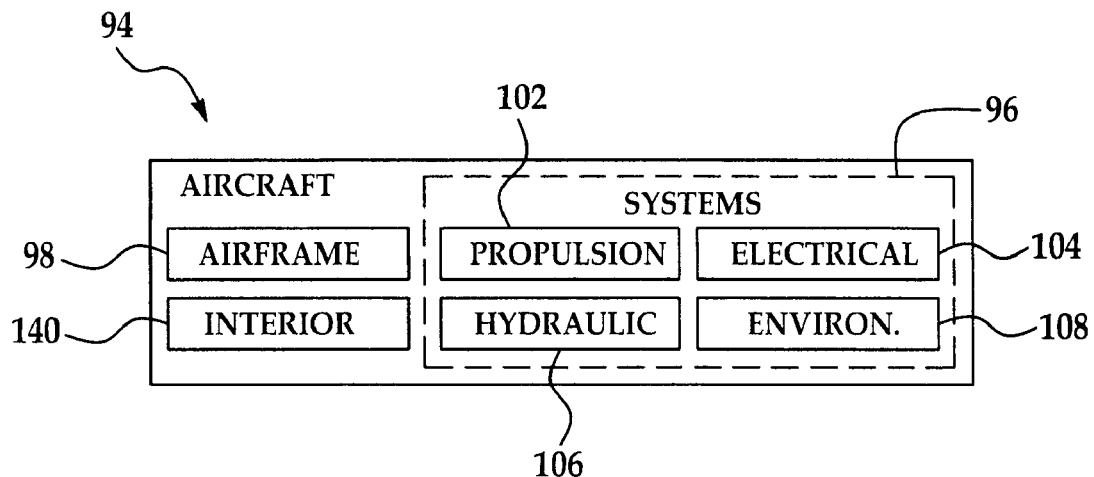
FIG. 13 is a block diagram of an aircraft.

Referring next to FIGS. 12 and 13, embodiments of the disclosure may be used in the context of an aircraft manufacturing and service method 78 as shown in FIG. 12 and an aircraft 94 as shown in FIG. 13. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A tie rod assembly, comprising:
   a composite tie rod shaft having a first end having a first shaft attachment head and a second end having a second shaft attachment head;
   a first clevis comprising a pair of complementary half-clevis sections coupled to said first shaft attachment head and defining a first clevis base, each half-clevis section comprising one of a pair of complementary first shaft receptacles within said first clevis base for receiving said first shaft attachment head, one of a pair of spaced-apart clevis eyes extending from said first clevis base, and a tapered lock ring seat;
   a lock ring having a tapered non-threaded through hole circumferentially engaging said lock ring seats of said half-clevis sections and being axially slid toward a distal end of said clevis eyes to clamp said first shaft attachment head within said first shaft receptacles;
   an externally threaded clevis adjustment collar comprising a pair of complementary half-collar sections coupled to said second shaft attachment head, each half-collar section comprising one of a pair of complementary second shaft receptacles for receiving said second shaft attachment head; and
   a second clevis comprising an internally threaded cylindrical second clevis base threadably engaging and adjustable along said clevis adjustment collar to secure said second shaft attachment head within said second shaft receptacles, a pair of spaced-apart clevis arms extending from said second clevis base and extending on opposite sides of said clevis attachment collar, and a pair of clevis eyes extending said second clevis arms, respectively.

2. The tie rod assembly of claim 1 wherein each of said first clevis, said clevis adjustment collar and said second clevis is titanium.

3. The tie rod assembly of claim 1 further comprising a pair of spaced-apart clevis arms extending from said first clevis base and wherein said clevis eyes of said first clevis extend from said clevis arms of said first clevis, respectively.

4. The tie rod assembly of claim 1 further comprising clevis adjustment threads provided on said clevis adjustment collar and wherein said clevis base threadably engages said clevis adjustment threads.

5. The tie rod assembly of claim 4 further comprising clevis arm threads provided on each of said clevis arms of said second clevis and engaging said clevis adjustment threads.

6. A tie rod assembly, comprising:
   a composite tie rod shaft having a first end and a second end;
   a first generally wedge-shaped shaft attachment head extending from said first end;

a second generally wedge-shaped shaft attachment head extending from said second end;

a first clevis comprising a pair of complementary half-clevis sections coupled to said first shaft attachment head and defining a first clevis base, each half-clevis section comprising one of a pair of complementary first shaft receptacles within said first clevis base for receiving said first shaft attachment head, one of a pair of spaced-apart clevis eyes extending from said first clevis base, and a tapered lock ring seat;

a lock ring having a tapered non-threaded through hole circumferentially engaging said lock ring seats of said half-clevis sections and being axially slid toward a distal end of said clevis eyes to clamp said first shaft attachment head within said first shaft receptacles;

an externally threaded clevis adjustment collar comprising a pair of complementary half-collar sections coupled to said second shaft attachment head, each half-collar section comprising one of a pair of complementary second shaft receptacles for receiving said second shaft attachment head, and clevis adjustment threads; and a second clevis comprising an internally threaded cylindrical second clevis base threadably engaging and adjustable along said clevis adjustment collar to secure said second shaft attachment head within said second shaft receptacles, a pair of spaced-apart clevis arms extending from said second clevis base and extending on opposite sides of said clevis attachment collar, and a pair of clevis eyes extending said second clevis arms, respectively, and clevis arm threads provided on interior surfaces of said clevis arms, respectively, and engaging said clevis adjustment threads.

7. The tie rod assembly of claim 6 further comprising a reverse tapered groove provided in said first shaft receptacle and a tapered bevel provided on said first end of said tie rod shaft and engaging said reverse tapered groove.

8. The tie rod assembly of claim 6 further comprising a reverse tapered groove provided in said second shaft receptacle and a tapered bevel provided on said second end of said tie rod shaft and engaging said reverse tapered groove.

9. The tie rod assembly of claim 6 wherein said first shaft receptacle and said second shaft receptacle each comprises a tapered wall portion and a flat wall portion extending from said tapered wall portion.

10. The tie rod assembly of claim 6 wherein each of said first clevis, said clevis adjustment collar and said second clevis is titanium.

11. The tie rod assembly of claim 6 further comprising a pair of spaced-apart clevis arms extending from said first clevis base and wherein said clevis eyes of said first clevis extend from said clevis arms of said first clevis, respectively.

* * * * *